United States Patent
Brand et al.

(10) Patent No.: US 10,969,007 B2
(45) Date of Patent: Apr. 6, 2021

(54) METHOD AND CONTROL APPARATUS FOR OPERATING A VEHICLE DRIVE TRAIN

(71) Applicant: ZF Friedrichshafen AG, Friedrichshafen (DE)

(72) Inventors: Tobias Brand, Eching (DE); Markus Maurer, Oberstaufen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 16/700,548

(22) Filed: Dec. 2, 2019

(65) Prior Publication Data
US 2020/0173550 A1    Jun. 4, 2020

(30) Foreign Application Priority Data
Dec. 3, 2018 (DE) .................. 10 2018 220 872.7

(51) Int. Cl.
*F16H 61/02* (2006.01)
*F16H 61/16* (2006.01)

(52) U.S. Cl.
CPC ......... *F16H 61/16* (2013.01); *F16H 61/0265* (2013.01); *F16H 2061/161* (2013.01); *F16H 2200/0065* (2013.01); *F16H 2200/2012* (2013.01); *F16H 2200/2046* (2013.01);
(Continued)

(58) Field of Classification Search
CPC ............. F16H 61/16; F16H 2200/0065; F16H 2708/20; F16H 2710/04; F16H 2710/20; F16H 61/0265; F16H 2200/2012; F16H 2200/2046; F16H 2061/161; F16H 2059/462; F16H 1/28; F16H 61/04; F16H 2059/147; F16H 2061/047; F16H 61/12; F16H 61/0213; F16H 61/686; F16H 2061/124; F16H 2061/0244
See application file for complete search history.

(56) References Cited

U.S. PATENT DOCUMENTS 5,997,435 A * 12/1999 Back ............... B60W 10/06
                                                            477/109
6,080,082 A    6/2000 Steeby
(Continued)

FOREIGN PATENT DOCUMENTS

DE    102005002337 A1    8/2006
DE    102008000429 A1    9/2009
(Continued)

OTHER PUBLICATIONS

German Search Report DE102018220872.7 dated Oct. 17, 2019. (14 pages).

*Primary Examiner* — David J Hlavka
(74) *Attorney, Agent, or Firm* — Dority & Manning, P.A.

(57) ABSTRACT

A method for operating a vehicle drive train (1) comprising a prime mover (2), transmission (3), and comprising a driven end (4) may include limiting, during a demand for engaging a form-locking shift element (A, F) of the transmission (3) when a rotational speed of the driven end (4) is close to zero, a rate of change of a transmission input torque present at the form-locking shift element (A, F) to a value. Below the value, forces present at the form-locking shift element (A, F) during an engagement process are less than a load limit. Above the value, irreversible damage to the form-locking shift element (A, F) occurs.

12 Claims, 3 Drawing Sheets

(52) U.S. Cl.
CPC ...... *F16H 2708/20* (2013.01); *F16H 2710/04* (2013.01); *F16H 2710/20* (2013.01)

(56) References Cited

U.S. PATENT DOCUMENTS

| | | | |
|---|---|---|---|
| 6,283,892 B1 * | 9/2001 | Steeby | F16H 61/28 |
| | | | 477/111 |
| 6,358,183 B1 * | 3/2002 | Hughes | B60W 10/06 |
| | | | 477/111 |
| 7,789,792 B2 | 9/2010 | Kamm et al. | |
| 8,398,522 B2 | 3/2013 | Bauknecht et al. | |
| 9,625,032 B2 | 4/2017 | Maurer et al. | |
| 2015/0112559 A1 | 4/2015 | Maurer et al. | |

FOREIGN PATENT DOCUMENTS

| | | |
|---|---|---|
| DE | 102013221036 A1 | 4/2015 |
| DE | 102013222381 A1 | 5/2015 |
| DE | 102016200725 A1 | 7/2017 |
| DE | 102016212357 A1 | 1/2018 |
| DE | 102017220626 A1 | 5/2019 |
| DE | 102018200778 A1 | 7/2019 |

* cited by examiner

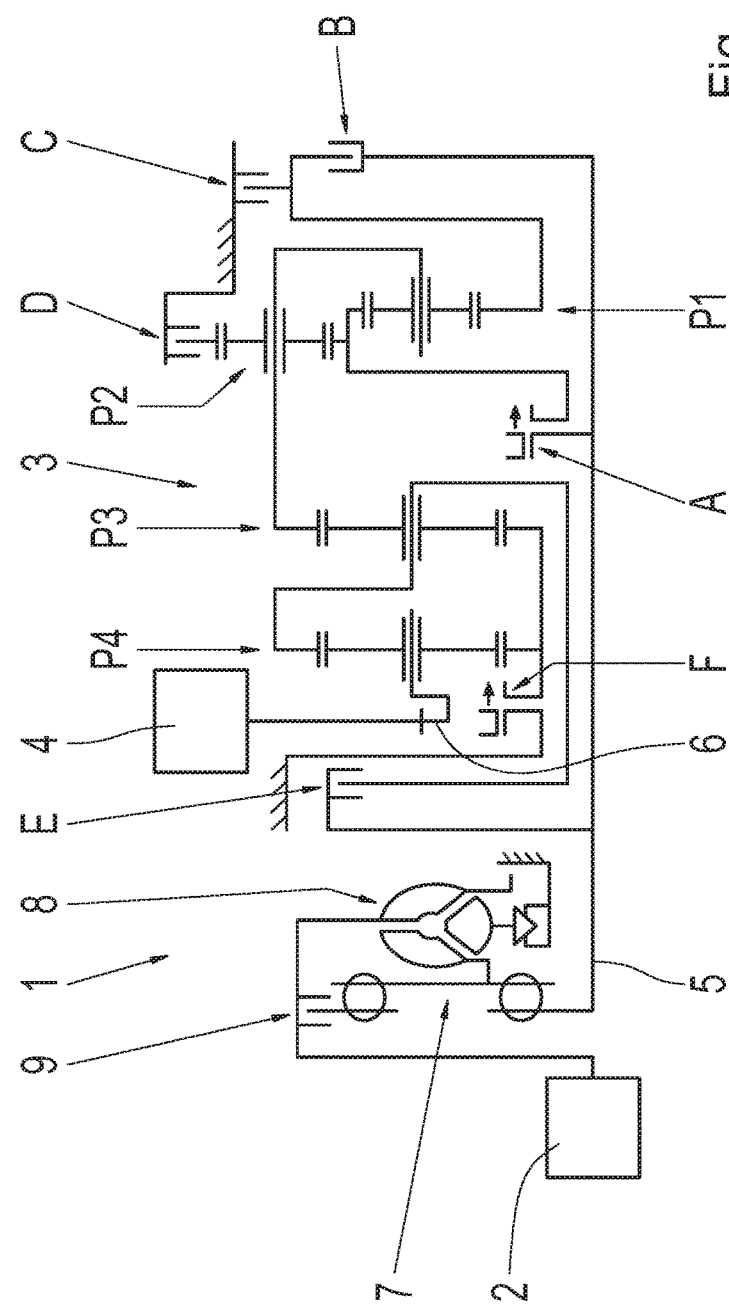

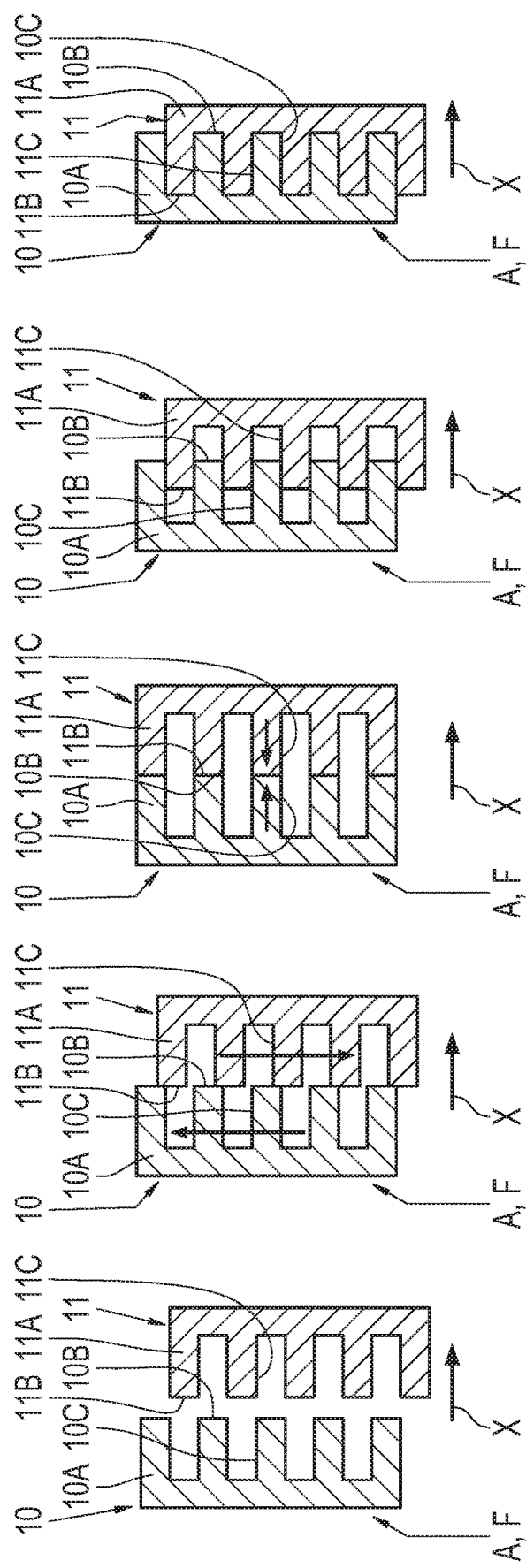

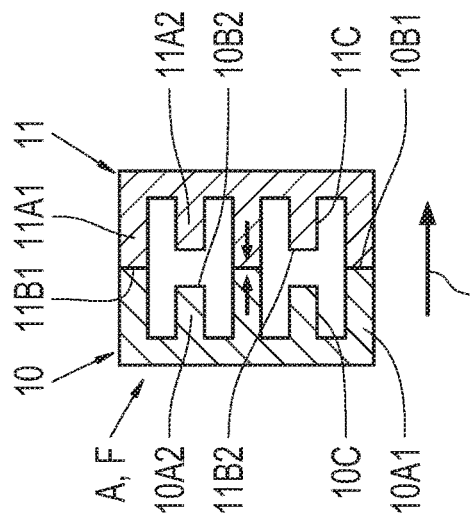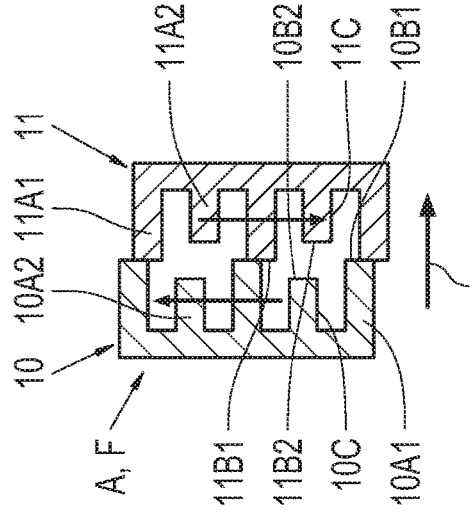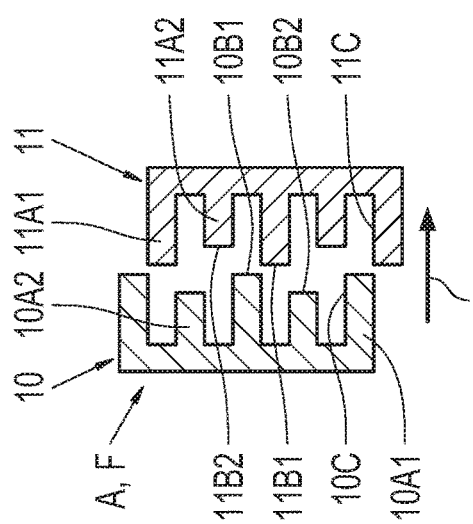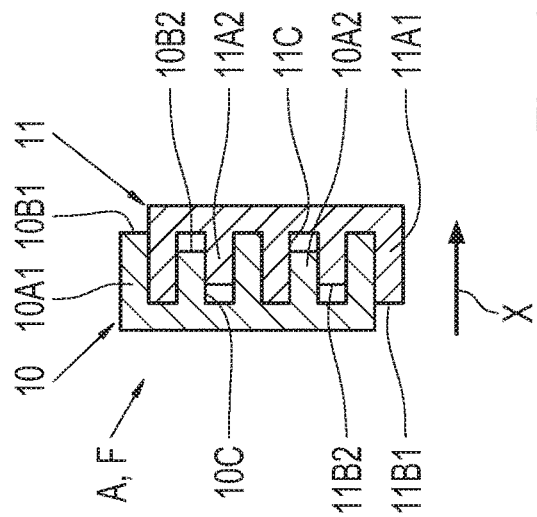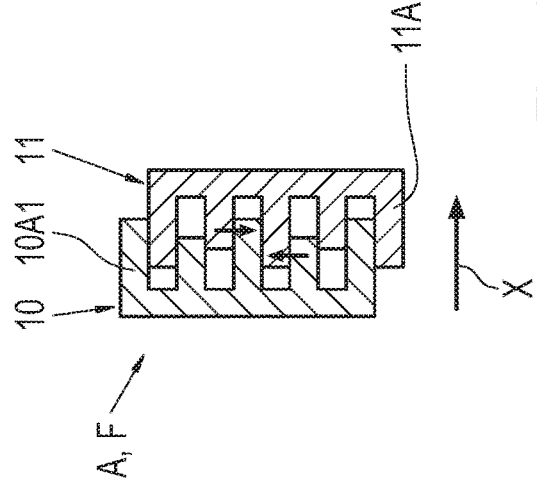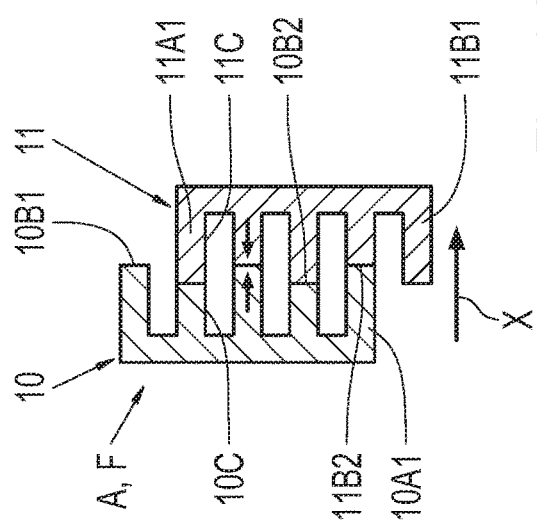

METHOD AND CONTROL APPARATUS FOR OPERATING A VEHICLE DRIVE TRAIN

CROSS-REFERENCE TO RELATED APPLICATION

The present application is related and has right of priority to German Patent Application No. 10 2018 220 872.7 filed on Dec. 3, 2018, the entirety of which is incorporated by reference for all purposes.

FIELD OF THE INVENTION

The invention relates to a method for operating a vehicle drive train. Moreover, the invention relates to a control unit for carrying out the method as well as to a corresponding computer program.

BACKGROUND

DE 10 2005 002 337 A1 describes an eight-speed multi-stage transmission having friction-locking shift elements. The shift elements are multi-disk clutches or multi-disk brakes. In the presence of a shift request for a ratio change in the transmission, at least one of the friction-locking shift elements is to be disengaged from the power flow of the transmission device and at least one further friction-locking shift element is to be engaged into the power flow of the transmission device in order to transmit a torque.

In general, in the presence of a demand to disengage a friction-locking shift element, regardless of the torque presently transmitted via the friction-locking shift element, it is assumed that the friction-locking shift element is actually transitioning into the disengaged operating condition. To the same extent, a demand to engage a friction-locking shift element is also implementable using comparatively little outlay for open-loop and closed-loop control.

For this reason, a simple software-based evaluation of an actuating current of a pressure regulator of a friction-locking shift element is sufficient. During the determination of an appropriate disengagement control signal or an appropriate engagement control signal for transferring the friction-locking shift element into its disengaged operating condition or its engaged operating condition, respectively, it can be easily verified whether a shift change or a gear change was successful via such evaluation.

Disadvantageously, however, friction-locking shift elements in the disengaged operating condition cause drag torques, which adversely affect an overall efficiency of an automatic transmission to an undesirable extent.

For this reason, transmission devices, such as those described in DE 10 2008 000 429 A1, increasingly include not only friction-locking shift elements but also form-locking shift elements. These types of form-locking shift elements usually have two shift-element halves. The shift-element halves are brought into form-locking engagement with one another via axial displacement of at least one movable shift-element half with respect to the other shift-element half, which is not axially displaceable, at dog elements, or the like of the shift-element halves. Thereupon, the form-locking shift element is engaged and transmits an applied torque. Moreover, it is also possible that both shift-element halves are axially movable with respect to one another.

If the form-locking shift element is to be disengaged from the power flow, the positive engagement between the shift-element halves is disengaged via axial displacement of the movable shift-element half with respect to the axially fixed shift-element half. Form-locking shift elements are used because, in contrast to friction-locking shift elements, essentially no drag torques occur with disengaged form-locking shift elements. Drag torques adversely affect the overall efficiency of a transmission. However, form-locking shift elements, as compared to friction-locking shift elements, are transferable out of a disengaged operating condition, in which no torque is transmitted by the form-locking shift elements, into their engaged operating condition only close to their synchronous speed.

Additionally, form-locking shift elements engaged into the power flow of a transmission device are disengageable from the power flow or transferable into their disengaged operating condition using low shifting forces if the applied torque has an appropriately low value. During gear change operations, or gear disengagement operations, a power flow between a transmission input shaft and a transmission output shaft is to be interrupted in the transmission. In this case, a form-locking shift element is to be transferred, if necessary, from its engaged operating condition into its disengaged operating condition. Due to an excessively rapid or faulty build-up of the torque applied to the form-locking shift element, or due to a faulty reduction of the applied torque, the form-locking shift element may not be transferable into its disengaged operating condition. In addition, it is also possible that mechanical, hydraulic, or electrical malfunctions prevent the disengagement of a form-locking shift element. For this reason, form-locking shift elements, in contrast to friction-locking shift elements, do not necessarily transition into a disengaged operating condition in the presence of an appropriate disengagement control signal.

Additionally, it is also possible that a disengaged form-locking shift element is not transferable into its engaged operating condition within desirably short operating times. This is the case, for example, when the sought positive engagement between the shift-element halves cannot be established due to a so-called tooth-on-tooth position. In the event of such a tooth-on-tooth position, dog elements of the shift-element halves rest against one another at their end faces and the differential speed between the shift-element halves is zero. Such a tooth-on-tooth position is released only when a torque present at the form-locking shift element is greater than the static friction torque between the end faces of the dog elements of the shift-element halves.

Moreover, the establishment of a complete positive engagement between the shift-element halves or the complete engagement of a form-locking shift element is also preventable by a so-called flank clamping between the flanks of the dog elements. In the event of such a flank clamping, the two shift element halves have axial overlap of their dog elements. However, the static friction between the flanks of the dog elements of the shift-element halves, which are resting against one another, is so high that the engagement force acting on the shift elements in the engagement direction is not sufficient to overcome the static friction and completely engage the form-locking shift element.

If, at a rotational speed of the driven end close to zero, a demand for a downshift arises in which one of the form-locking shift elements of the transmission device described above in greater detail is to be transferred into its engaged operating condition, it is possible that a tooth-on-tooth position or a flank clamping occurs. In order to release the tooth-on-tooth position or the flank clamping, all shift elements of the transmission device are abruptly disengaged in approaches known from practical experience. As a result, however, the force-fit connection in the transmission is disadvantageously lost. Subsequently reestablishing the force-fit connection requires a great deal of actuation effort, with little spontaneity.

Starting from the above-described prior art, the problem addressed by the invention is that of creating a method for operating a vehicle drive train by which a form-locking shift element is engageable close to a standstill of the vehicle without losing the force-fit connection in the area of a transmission. Additionally, a control unit for carrying out the method and a computer program product for carrying out the method are to be described.

SUMMARY OF THE INVENTION

A method for operating a vehicle drive train having a prime mover, a transmission, and a driven end, during a demand for engaging a form-locking shift element of the transmission at a rotational speed of the driven end close to zero.

In the present case, for example, constant-mesh shift elements, which transmit torque via a form-locking connection, are subsumed under the term "form-locking shift element". Moreover, shift elements, such as clutches or brakes in the present case, are subsumed in the following under the term "friction-locking shift element", which transmit torque via a friction-locking connection. The torque transmittable via a friction-locking shift element varies depending on the particular engagement force applied to the friction-locking shift element and is preferably infinitely variable. The engagement force corresponds, for example, to a hydraulic pressure applied to the shift element. In contrast thereto, the torque transmittable via a form-locking shift element is not infinitely variable.

A gradient of a progression or rate of change of a transmission input torque present at the shift element is limited to a value, below which forces present at the form-locking shift element during an engagement process are less than a load limit, and above which irreversible damage to the form-locking shift element occurs.

By limiting the gradient of the transmission input torque according to the invention, the possibility exists to easily release a tooth-on-tooth position or flank clamping of the form-locking shift element preferably during a downshift close to a standstill of the vehicle, without losing the force-fit connection in the transmission.

By limiting the gradient of the transmission input torque, for example, a differential speed between the shift-element halves of the form-locking shift element also builds up only with a limited gradient. This facilitates the establishment of the positive engagement between the shift-element halves. The limitation of the gradient of the progression of the transmission input torque prevents an excessively rapid increase of the torque present at the form-locking shift element if an operator demands a correspondingly high gradient of the progression of the transmission input torque during an engagement process.

An excessively high gradient of the progression of the transmission input torque, in particular in the presence of a tooth-on-tooth position, can cause irreversible damage of the form-locking shift element.

In an advantageous embodiment of the method according to the invention, a torque present at the shift element, an actuation force of the shift element in the engagement direction, and a differential speed between shift-element halves of the form-locking shift element are varied, in the presence of a demand for engaging the shift element, such that the form-locking shift element is transferred into its engaged operating condition.

It is therefore ensured that the form-locking shift element is transferred into its engaged operating condition as demanded.

In an embodiment of the method according to the invention, the differential speed between the shift-element halves of the form-locking shift element is adjusted to values within a speed range in each case. The speed range encompasses the zero point of the differential speed or the synchronous speed of the form-locking shift element. Within the speed range, the shift-element halves can be brought into engagement with one another in a form-locking manner. With the aid of this approach, it is very likely ensured that the form-locking shift element is transferred into its engaged operating condition as demanded.

In a further advantageous embodiment of the method according to the invention, a torque present at the shift element is adjusted, in each case, to values greater than a threshold value during the engagement process and before a positive engagement between the shift-element halves. The threshold value of the torque advantageously corresponds to a torque value, above which a tooth-on-tooth position between the shift-element halves of the shift element does not take place. The threshold value corresponds to a limit of the torque value present at the shift element, above which a static friction possibly present between the shift-element halves, which are not yet in overlap, is overcome. Therefore, the establishment of the demanded positive engagement is carried out to the desired extent.

In a further advantageous embodiment of the method according to the invention, an actuation force present at the shift element is adjusted, in each case, to values less than a threshold value during the engagement process and before a positive engagement between the shift-element halves. The threshold value advantageously represents a limit of the actuation force, below which a tooth-on-tooth position between the shift-element halves does not take place and the form-locking shift element is transferable into its engaged operating condition. With this approach, it is ensured that static friction does not build up between the shift-element halves, which are not yet in overlap, which facilitates or brings about a tooth-on-tooth position and prevents the engagement of the form-locking shift element.

Moreover, it is provided that a torque present at the shift element is adjusted, in each case, to values less than a threshold value during the engagement process and in the presence of a positive engagement between the shift-element halves. The threshold value advantageously represents a limit of the torque, below which flank clamping between the shift-element halves does not take place and the form-locking shift element is transferable into its engaged operating condition to the desired extent.

In addition, it is provided that an actuation force present at the shift element is adjusted, in each case, to values greater than a threshold value during the engagement process and in the presence of a positive engagement between the shift-element halves. Advantageously, the threshold value is defined in such a way that, upon an actuation of the shift element with an actuation force above the threshold value, flank clamping between the shift-element halves does not take place and the shift element is transferable into its engaged operating condition.

In a further advantageous variant of the method according to the invention, the torque present at the form-locking shift element is varied by an appropriate actuation of friction-locking shift elements of a transmission if the form-locking shift element is a shift element of the transmission.

Alternatively, or additionally, it is also possible to vary the torque present at the form-locking shift element by adjusting the torque present at the transmission input shaft. This is easily implemented, for example, by varying a drive torque of a prime mover of a vehicle drive train, which is operatively connected to the transmission input shaft.

The invention also relates to a control unit for carrying out the method according to the invention. The control unit has, for example, means utilized for carrying out the method according to the invention. These means include hardware-related means and software-related means. The hardware-related means of the control unit or of the control device are, for example, data interfaces for exchanging data with the assemblies of the vehicle drive train contributing to the carrying-out of the method according to the invention. Further hardware-related means are, for example, a memory for data storage and a processor for data processing. Software-related means can be, inter alia, program modules for carrying out the method according to the invention.

In order to carry out the method according to the invention, the control unit is operable using at least one receiver interface for receiving signals from signal transmitters. The signal transmitters can be, for example, sensors, which gather measured quantities and transmit them to the control unit. A signal transmitter is also referred to as a signal sensing element. In this way, the receiver interface receives a signal from a signal transmitter, via which it is signaled that a gradient of a progression of a transmission input torque present at the shift element is to be determined. The signal is generated by a driving strategy, which is activated and carried out in the area of the control unit or in the area of a further control unit of the vehicle drive train.

In one embodiment, the control unit also includes a data processing unit to evaluate and/or process the received input signals or the information of the received input signals.

In some embodiments, the control unit also includes a transmit interface which outputs control signals to actuating elements. An actuating element is understood to be actuators that implement the commands of the control unit. The actuators can be, for example, electromagnetic valves.

If, during the operation of the vehicle drive train, it is detected by the control unit or determined on the basis of received input signals that a form-locking shift element is to be engaged and that a rotational speed of the driven end is close to zero, the control unit determines, on the basis of gathered input signals, an appropriate demand and initiates an appropriate actuation of the form-locking shift element.

The control unit limits a gradient of a progression of a transmission input torque present at the shift element to a value. The value is output by the control unit, below which forces present at the form-locking shift element during an engagement process are less than a load limit, and above which irreversible damage to the form-locking shift element occurs.

As a result, it is ensured in a simple way that a torque present at the shift element does not increase too quickly and a tooth-on-tooth position or flank clamping in the area of the form-locking shift element is releasable in the case of a downshift close to a standstill of the vehicle without the need to interrupt the force-fit connection in the transmission.

The aforementioned signals are to be considered merely as examples and are not intended to limit the invention. The gathered input signals and the output control signals are transmittable via a vehicle bus, for example, via a CAN-BUS. The control device or the control unit is, for example, a central electronic control unit of the vehicle drive train or an electronic transmission control unit.

The approach according to the invention, in some embodiments, includes a computer program product, which, when running on a processor of a control device, instructs the processor (from the software point of view) to carry out the assigned method steps. As such, a computer-readable medium, on which an above-described computer program product is retrievably stored, is also included in such embodiments.

BRIEF DESCRIPTION OF THE DRAWINGS

Preferred refinements result from the dependent claims and the following description. An exemplary embodiment of the invention is explained in greater detail with reference to the drawing, without being limited thereto. Wherein:

FIG. 1 shows a schematic of a vehicle drive train having a prime mover, a transmission, and a driven end;

FIG. 2 shows a shift logic, in table form, of the transmission shown in FIG. 1;

FIGS. 3a-3e each show various, highly schematic views of different operating conditions of a form-locking shift element between a completely disengaged condition and a completely engaged condition; and FIG. 4a-4f each show highly schematic views of various operating conditions of a form-locking shift element whose dog elements have different lengths.

DETAILED DESCRIPTION

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows a schematic view of a vehicle drive train 1 having a prime mover 2, a transmission 3, and a driven end 4. The prime mover 2 is, in one embodiment, an internal combustion engine. The transmission 3 is an automatic transmission, in which multiple gear stages "1"-"9" (FIG. 2) for forward travel and at least one gear stage "R" (FIG. 2) for travel in reverse are implementable. Depending on the particular configuration of the vehicle drive train 1, the driven end 4 has one, two, or more drivable vehicle axles to which the torque of the prime mover 2 is applicable via the transmission 3. The transmission 3 includes a first hydraulically actuatable shift element A, a second hydraulically actuatable shift element B, a third hydraulically actuatable shift element C, a fourth hydraulically actuatable shift element D, a fifth hydraulically actuatable shift element E, and a sixth hydraulically actuatable shift element F. Hydraulically actuatable shift elements A-F are actuated during a ratio change in the transmission 3, i.e., during upshifts or downshifts. The ratio changes are to be carried out essentially without an interruption of tractive force, in combination with a high level of ride comfort and at a desired level of performance. The term "performance" is understood to mean, in each case, a ratio change in the transmission 3 that is implemented within a defined operating time.

In order to be able to carry out the particular demanded gear shift to the desired extent, the shift elements A-F are selectively acted upon according to shift sequences stored in a transmission control unit and a shift pressure corresponding to the particular shift sequence.

The transmission 3 has a transmission input shaft 5 and a transmission output shaft 6. The transmission output shaft 6 is connected to the driven end 4. In the present case, a torsion damper 7 and a hydrodynamic torque converter 8, as a starting component, having an associated torque converter lockup clutch 9 are arranged between the transmission input shaft 5 and the prime mover 2.

In addition, the transmission 3 includes a first planetary gear set P1, a second planetary gear set P2, a third planetary gear set P3, and a fourth planetary gear set—P4. The first planetary gear set P1 and the second planetary gear set P2, which are preferably minus planetary gear sets, form a shiftable front-mounted gear set. The third planetary gear set P3 and the fourth planetary gear set P4 represent a main gear set. The third shift element C, the fourth shift element D, and the sixth shift element F of the transmission 3 are brakes, while the first shift element A, the second shift element B, and the fifth shift element E are separating clutches.

Selective shifting of the gear stages "1"-"R" is implementable via the shift elements A-F according to the shift logic represented in greater detail in FIG. 2. In order to establish a power flow in the transmission, three of the shift elements A-F are to be transferred into or held in an engaged operating condition essentially simultaneously in each gear stage.

The first shift element A and the sixth shift element F are, in this case, form-locking shift elements without additional synchronization. As a result, in the case of the transmission 3, as compared to transmissions including only friction-locking shift elements, drag torques caused by disengaged friction-locking shift elements are reduced.

As is known, form-locking shift elements are generally transferable out of a disengaged operating condition into an engaged operating condition only within a very narrow range of differential speeds between the shift-element halves to be brought into an operative connection with one another in a form-locking manner, where the range encompasses the synchronous speed. If the synchronization of a form-locking shift element to be engaged cannot be carried out with the aid of additional structural embodiments, the synchronization is implemented via an appropriate actuation of the further friction-locking shift elements contributing to the gear shift and/or an engine override. During such an engine override, for example, the drive torque made available by the prime mover 2 is varied in the coasting condition as well as in the traction operation of the vehicle drive train 1 to the extent necessary for the synchronization. This also applies for the actuation of the friction-locking shift elements during the carrying-out of demanded traction or coasting shifts.

FIGS. 3a-3e each show two shift-element halves 10, 11 of the form-locking shift element A, F in various operating conditions. FIG. 3a shows the completely disengaged operating condition of the form-locking shift element A, F, in which there is no positive engagement between the first shift element half 10 and the second shift element half 11, and in which the shift-element halves 10, 11 are spaced apart from one another in the axial direction x.

The first shift element half 10 has a first dog element 10A and the second shift element half 11 has a second dog element 11A. The dog elements 10A, 11A are brought into engagement with one another in a form-locking manner depending on the particular current application via axial displacement of the first shift-element half 10 relative to the second shift-element half 11 and/or of the second shift-element half 11 relative to the first shift-element half 10 in order to transmit a torque present at the form-locking shift element A, F to the desired extent.

In the presence of an appropriate demand to engage the form-locking shift element A, F, an appropriate actuation force is applied in the engagement direction at the particular displaceable shift-element half 10, 11. As a result, the axial distance between the end faces 10B, 11B of the dog elements 10A, 11A facing one another is increasingly reduced.

If the differential speed between the shift-element halves 10, 11 is too great, the dog elements 10A, 11A cannot be brought into engagement with one another in a form-locking manner. In such a case, a rattling occurs, during which the dog elements 10A, 11A glide off of one another, at their adjacent end faces 10B, 11B, in the circumferential direction of the shift element halves 10, 11 to the extent shown in FIG. 3b. Such a rattling is undesirable, however, since it causes irreversible damage in the area of the dog elements 10A, 11A as the period of operation increases.

For this reason, the differential speed between the shift-element halves 10, 11 is adjusted to values within a differential speed window, which encompasses the synchronous speed of the form-locking shift element A, F, via appropriate actuation of the particular friction-locking shift elements B-E contributing to the operating condition change in the transmission 3. Within this differential speed window, the dog elements 10A, 11A of the shift-element halves 10, 11 can be brought into engagement with each other in a form-locking manner to the desired extent.

It should be noted, however, that the positive engagement to be established is preventable by a so-called tooth-on-tooth position between the shift-element halves 10, 11. The tooth-on-tooth position, as represented in FIG. 3c, is characterized in that the dog elements 10A, 11A rest against one another at their end faces 10B, 11B, and the differential speed between the shift-element halves 10, 11 is zero. During such a tooth-on-tooth position of the form-locking shift element A, F, the static friction between the end faces 10B, 11B of the dog elements 10A, 11A is so great that the torque present at the form-locking shift element A, F is transmitted via the form-locking shift element A, F without the tooth-on-tooth position being released or unmeshed.

In order to release the tooth-on-tooth position, it is advantageous if the actuation force acting on the form-locking shift element A, F in the engagement direction is reduced and/or the torque present at the form-locking shift element A, F is increased. The static friction between the end faces 10B, 11B of the dog elements 10A, 11A is lowered via the reduction of the engagement force. Simultaneously, by raising the torque present at the form-locking shift element A, F, the static friction between the end faces 10B, 11B is overcome and the differential speed between the shift-element halves 10, 11 increases to an extent that enables the positive engagement between the dog elements 10A, 11A to be established.

FIG. 3d shows an operating condition of the form-locking shift element A, F, in which a positive engagement between the shift-element halves 10, 11 is present with a partial overlap of the dog elements 10A, 11A. Such an operating condition is present during a disengagement process as well as during an engagement process of the form-locking shift element A, F.

The torque acting on the shift element A, F and the coefficients of friction of the flanks 10C, 11C yield a static friction force, which acts between the flanks 10C, 11C. If the actuation force acting on the shift-element halves 10, 11 in the disengagement direction or in the engagement direction of the form-locking shift element A, F is too low in relation to the static friction force between the flanks 10C, 11C of the dog elements 10A, 11A, flank clamping occurs. During flank clamping, the relative axial actuating movement between the shift-element halves 10, 11 in the engagement direction or in the disengagement direction is zero, and so the demanded operating condition change of the form-locking shift element A, F does not take place. In order to prevent or release such a flank clamping, the actuation force acting on the shift element A, F, for example, is raised and/or the particular torque present at the form-locking shift element A, F is reduced to the extent necessary for this purpose.

The completely engaged operating condition of the form-locking shift element A, F is represented in FIG. 3e, in which the full overlap between the dog elements 10A, 11A in the axial direction x is present.

FIGS. 4a-4f each show a representation of the form-locking shift element A, F corresponding to FIG. 3a. In the case of the shift element A, F, the dog elements 10A, 11A of the shift-element halves 10, 11, which are arranged next to one another in the circumferential direction of the shift-element halves 10, 11, each have a different length in the axial direction x. In the following, the first dog element 10A has a longer dog element 10A1 and a shorter dog element 10A2, and the second dog element 11A has a longer dog element 11A1 and a shorter dog element 11A2.

This embodiment of the form-locking shift elements A, F offers the advantage that the positive engagement between the shift-element halves 10, 11 can be established at higher differential speeds between the shift-element halves 10, 11 than is the case with the embodiment of the form-locking shift elements A, F represented in FIGS. 3a-3e. However, the embodiment of the form-locking shift element A, F according to FIGS. 4a-4f is less robust against rattling as compared to the embodiment of the form-locking shift element A, F according to FIGS. 3a-3e.

The shift element A, F can have further operating conditions, due to the combination of the longer dog elements 10A1, 11A1 and the shorter dog elements 10A2, 11A2, in addition to the operating conditions of the form-locking shift element A, F described with reference to FIGS. 3a-3e. The further operating conditions will be described in greater detail in the following description of FIGS. 4a-4f.

Initially, the completely disengaged operating condition of the shift element A, F is represented in FIG. 4a. FIG. 4b shows the operating condition of the form-locking shift element A, F during a rattling operation. During the rattling operation, the shift-element halves 10, 11 glide off of one another at the end faces 10B1, 11B1 of the longer dog elements 10A1, 11A1 in the circumferential direction. Therefore, the positive engagement between the shift-element halves 10, 11 cannot be established. This rattling operation is prevented or ended to the extent described with reference to FIG. 3b by reducing the differential speed between the shift-element halves 10, 11.

Moreover, FIG. 4c and FIG. 4d each show a tooth-on-tooth position, which prevents the establishment of the positive engagement between the shift-element halves 10, 11. In the operating condition of the form-locking shift element A, F represented in FIG. 4c, the tooth-on-tooth position is between the end faces 10B1, 11B1 of the longer dog elements 10A1, 11A1. In contrast thereto, the tooth-on-tooth position between the shift-element halves 10, 11 in the operating condition of the form-locking shift element A, F represented in FIG. 4d is between the end faces 11B1 of the longer dog elements 11A1 of the shift-element half 11 and the end faces 10B2 of the shorter dog elements 10A2 of the shift-element half 10.

Regardless of the particular tooth-on-tooth position between the shift-element halves 10, 11, the tooth-on-tooth positions are released or prevented in the way described with respect to FIG. 3c.

FIG. 4e shows an intermediate operating condition of the form-locking shift element A, F between the completely disengaged operating condition and the completely engaged operating condition of the form-locking shift element A, F. During this intermediate operating condition, flank clamping—described above—between the dog elements 10A1, 10A2 and the dog elements 11A1, 11A2, respectively, is possible. The flank clamping is prevented or released to the extent described with reference to FIG. 3d in order to disengage or engage the form-locking shift element A, F to the demanded extent.

The completely engaged operating condition of the form-locking shift element A, F is represented in FIG. 4f.

If a vehicle including the vehicle drive train 1 is at a standstill or is close to a standstill, and if, for example, a downshift is demanded by the transmission control unit, in the case of which the form-locking shift element A, F is to be transferred into the engaged operating condition, the gradient of the transmission input torque is initially limited. As a result, an excessively rapid increase of the torque present at the form-locking shift element A, F is prevented if a driver demands a starting process, as an excessively great gradient of the progression of the transmission input torque in the presence of a tooth-on-tooth position of the form-locking shift element A, F can cause damage in the area of the transmission 3.

Moreover, a tooth-on-tooth position or flank clamping of the form-locking shift element A, F during the downshift and close to the standstill of the vehicle can be released without releasing the force-fit connection in the transmission 3 if the gradient of the progression of the transmission input torque is limited.

During a starting process, the torque present at the form-locking shift element A, F increases, whereby a tooth-on-tooth position, which may be present, is released above a defined torque value.

If the torque present at the form-locking shift element A, F has an appropriate value, the actuation force acting in the engagement direction of the form-locking shift element A, F is subsequently raised if a positive engagement of the form-locking shift element A, F is detected. As a result, a flank clamping can be released to the desired extent.

If a driver-side demand to disengage the gear stage "1"-"R" currently engaged in the transmission 3 is present, all shift elements A-F of the transmission 3 are abruptly disengaged. Therefore, although the force-fit connection in the area of the transmission 3 is interrupted, this corresponds to the driver demand and, therefore, is not perceived as disruptive.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE NUMBERS 1 vehicle drive train
2 prime mover
3 transmission
4 driven end
5 transmission input shaft
6 transmission output shaft
7 torsion damper
8 hydrodynamic torque converter
9 torque converter lockup clutch
10, 11 shift-element half
10A, 10A1, 10A2 dog element
11A, 11A1, 11A2 dog element
10B, 10B1, 10B2 end face of the dog element
10C flank of the dog element
11B, 11B1, 11B2 end face of the dog element
11C flank of the dog element
"1" to "9" transmission ratio for forward driving
A to F shift element
P1 to P4 planetary gear set
"R" transmission ratio for travel in reverse

The invention claimed is:

1. A method for operating a vehicle drive train (1) comprising a prime mover (2), a transmission (3), and comprising a driven end (4), the method comprising:
 limiting, during a demand for engaging a form-locking shift element (A, F) of the transmission (3) when a rotational speed of the driven end (4) is zero, a rate of change of a transmission input torque at the form-locking shift element (A, F) to a value,
 wherein below the value, one or more forces at the form-locking shift element (A, F) during an engagement process are less than a load limit, and
 wherein above the value, irreversible damage to the form-locking shift element (A, F) occurs.

2. The method of claim 1, further comprising varying, in the presence of the demand to engage the form-locking shift element (A, F), a torque at the form-locking shift element (A, F), an actuation force of the form-locking shift element (A, F) in the engagement direction, and a differential speed between shift-element halves (10, 11) of the form-locking shift element (A, F) in order to transfer the form-locking shift element (A, F) into an engaged operating condition.

3. The method of claim 1, further comprising adjusting, during the engagement process, a differential speed between shift-element halves (10, 11) of the form-locking shift element (A, F) to a value within a speed range, the shift-element halves (10, 11) being brought into engagement with each other in a form-fitting manner within the speed range, the speed range encompassing a zero point.

4. The method of claim 1, further comprising adjusting, during the engagement process and before a positive engagement between shift-element halves (10, 11) of the form-locking shift element (A, F), a torque at the form-locking shift element (A, F) to a value greater than a threshold value, wherein, above the threshold value, a tooth-on-tooth position between the shift-element halves (10, 11) does not occur.

5. The method of claim 1, further comprising adjusting, during the engagement process and before a positive engagement between shift-element halves (10, 11) of the form-locking shift element (A, F), an actuation force at the form-locking shift element (A, F) to a value less than a threshold value, wherein, below the threshold value, a tooth-on-tooth position between the shift-element halves (10, 11) does not occur and the form-locking shift element (A, F) is transferable into an engaged operating condition.

6. The method of claim 1, further comprising adjusting, during the engagement process and when the shift-element halves (10, 11) of the form-locking shift element (A, F) are positively engaged, a torque at the form-locking shift element (A, F) to a value less than a threshold value, wherein, below the threshold value, flank clamping between the shift-element halves (10, 11) does not occur.

7. The method claim 1, further comprising adjusting, during the engagement process and when shift-element halves (10, 11) of the form-locking shift element (A, F) are positively engaged, an actuation force at the form-locking shift element (A, F) to a value greater than a threshold value, wherein, above the threshold value, flank clamping between the shift-element halves (10, 11) does not occur and the form-locking shift element (A, F) is transferable into an engaged operating condition.

8. The method of claim 1, wherein the transmission (3) comprises further shift elements (B, C, D, E), the further shift elements (B, C, D, E) being friction-locking shift elements, wherein a torque at the form-locking shift element (A, F) is varied by selective actuation of the further shift elements (B, C, D, E).

9. The method of claim 1, wherein a torque at the form-locking shift element (A, F) is varied by adjusting the transmission input torque.

10. A control unit for operating a vehicle drive train (1) that comprises a prime mover (2), a transmission (3), and a driven end (4), the transmission (3) comprising at least one form-locking shift element (A, F), the control unit configured for:
 limiting, during a demand for engaging the form-locking shift element (A, F) when a rotational speed of the driven end (4) is zero, a gradient of a progression of a transmission input torque at the form-locking shift element (A, F) to a value,
 wherein, below the value, one or more forces at the form-locking shift element (A, F) during an engagement process are less than a load limit, and
 wherein, above the value, irreversible damage to the form-locking shift element (A, F) occurs.

11. The control unit of claim 10, wherein the control unit carries out the method of claim 1 on a control side.

12. A computer program comprising program code stored on a non-transitory computer-readable medium with software instructions to carry out the method of claim 1 when executed on a control unit.

* * * * *